United States Patent
Evans et al.

(10) Patent No.: US 9,052,404 B2
(45) Date of Patent: Jun. 9, 2015

(54) WELL-LOGGING APPARATUS INCLUDING AZIMUTHALLY-SPACED, NOBLE GAS-BASED DETECTORS

(71) Applicant: Schlumberger Technology Corporation, Sugar Land, TX (US)

(72) Inventors: Michael L. Evans, Missouri City, TX (US); Avtandil Tkabladze, Sugar Land, TX (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/728,901

(22) Filed: Dec. 27, 2012

(65) Prior Publication Data

US 2014/0034821 A1    Feb. 6, 2014

Related U.S. Application Data

(60) Provisional application No. 61/581,674, filed on Dec. 30, 2011.

(51) Int. Cl.
*G01V 5/08* (2006.01)
*G01V 5/04* (2006.01)
*G01V 5/10* (2006.01)

(52) U.S. Cl.
CPC .. *G01V 5/08* (2013.01); *G01V 5/04* (2013.01); *G01V 5/10* (2013.01)

(58) Field of Classification Search
CPC ........................................................ G01V 5/08

USPC ............. 250/254, 264, 265, 266, 267, 269.2, 250/269.1
See application file for complete search history.

(56) References Cited

U.S. PATENT DOCUMENTS

| | | |
|---|---|---|
| 4,169,979 A | 10/1979 | Arnold et al. |
| 4,416,151 A | 11/1983 | Ullo |
| 4,423,323 A | 12/1983 | Ellis et al. |
| 4,577,102 A | 3/1986 | Sherman et al. |
| 4,604,522 A | 8/1986 | Arnold |
| 4,698,501 A | 10/1987 | Paske |
| 4,879,463 A | 11/1989 | Wraight et al. |
| 5,094,808 A | 3/1992 | Meeh |
| 5,180,917 A | 1/1993 | Wraight |
| 5,404,752 A | 4/1995 | Chace et al. |

(Continued)

FOREIGN PATENT DOCUMENTS

WO    2009020996 A2    2/2009

OTHER PUBLICATIONS

International Search Report and Written Opinion issued in PCT/US2012/071909 on Apr. 19, 2013, 8 pages.

*Primary Examiner* — David Porta
*Assistant Examiner* — Faye Boosalis
(74) *Attorney, Agent, or Firm* — Cathy Hewitt; Michael Dae

(57) ABSTRACT

A well-logging device may include a housing to be positioned within a borehole of a subterranean formation, and at least one radiation source carried by the housing to direct radiation into the subterranean formation. The well-logging device may also include noble gas-based radiation detectors carried by the housing in azimuthally spaced relation to detect radiation from the subterranean formation. A controller may determine at least one property of the subterranean formation based upon the detected radiation from the noble gas-based radiation detectors.

21 Claims, 16 Drawing Sheets

(56) References Cited

U.S. PATENT DOCUMENTS

| | | |
|---|---|---|
| 5,528,030 A | 6/1996 | Mickael |
| 5,539,225 A | 7/1996 | Loomis et al. |
| 6,207,953 B1 | 3/2001 | Wilson |
| 6,452,191 B1 | 9/2002 | Johnson et al. |
| 6,648,083 B2 | 11/2003 | Evans et al. |
| 7,587,936 B2 | 9/2009 | Han |
| 8,076,634 B2 | 12/2011 | Stoller |
| 8,346,481 B2 | 1/2013 | Jacobson et al. |
| 8,742,329 B2 * | 6/2014 | Korkin et al. .......... 250/266 |
| 2010/0017134 A1 | 1/2010 | Steinman et al. |
| 2010/0314536 A1 | 12/2010 | Molz et al. |
| 2011/0204217 A1 | 8/2011 | Oraby et al. |

* cited by examiner

WELL-LOGGING APPARATUS INCLUDING AZIMUTHALLY-SPACED, NOBLE GAS-BASED DETECTORS

RELATED APPLICATION

This application claims the benefit of a related U.S. Provisional Application Ser. No. 61/581,674, filed Dec. 30, 2011, entitled "USING XENON TUBES FOR FORMATION DENSITY MEASUREMENTS," the disclosure of which is incorporated by reference herein in its entirety.

BACKGROUND

Density measurements of a subterranean formation may be based upon exponential law of photon attenuation in the subterranean formation. The photon flux attenuated with distance from the source may depend strongly on the concentration of shell electrons of subterranean formation material (i.e. the electron density). Therefore, by measuring the flux of the photons away from a photon source irradiating the subterranean formation one can extract the so-called subterranean formation electron density. For most materials electron density defines the material mass density by a linear transform.

For photon detection, scintillator-based detectors may be used in density tools for borehole density measurements. The photons entering the crystal produce scintillation light that is amplified and transferred to electronic pulses by photomultiplier tubes (PMTs). These detectors are relatively efficient with increased spectral quality depending on the crystal material. However, the properties of the crystals and the quality and dimensions of PMTs do not always allow the use of such detectors in borehole applications. The crystals and PMTs are relatively fragile and additional shock absorbing packaging is often used for borehole operations. The operating temperature range of many scintillators may also be limited. The PMTs for borehole applications are rather large and may exceed 0.5 inches in outside diameter (OD), and performance generally degrades at relatively high temperatures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging apparatus may include a housing to be positioned within a borehole of a subterranean formation, and at least one radiation source carried by the housing to direct radiation into the subterranean formation. The well-logging apparatus may also include noble gas-based radiation detectors carried by the housing in azimuthally spaced relation to detect radiation from the subterranean formation. A controller may determine at least one property of the subterranean formation based upon the detected radiation from the noble gas-based radiation detectors.

A method aspect is directed to a method of determining at least one property of a subterranean formation. The method may include directing radiation from at least one radiation source carried by a housing positioned within a borehole of the subterranean formation and detecting radiation from the subterranean formation using noble gas-based radiation detectors carried by the housing in azimuthally spaced relation. The method may also include determining, using a controller, the at least one property of the subterranean formation based upon the detected radiation from the noble gas-based radiation detectors.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation and numbers in increments of 100 are used to refer to like elements in different embodiments.

Figure 1:
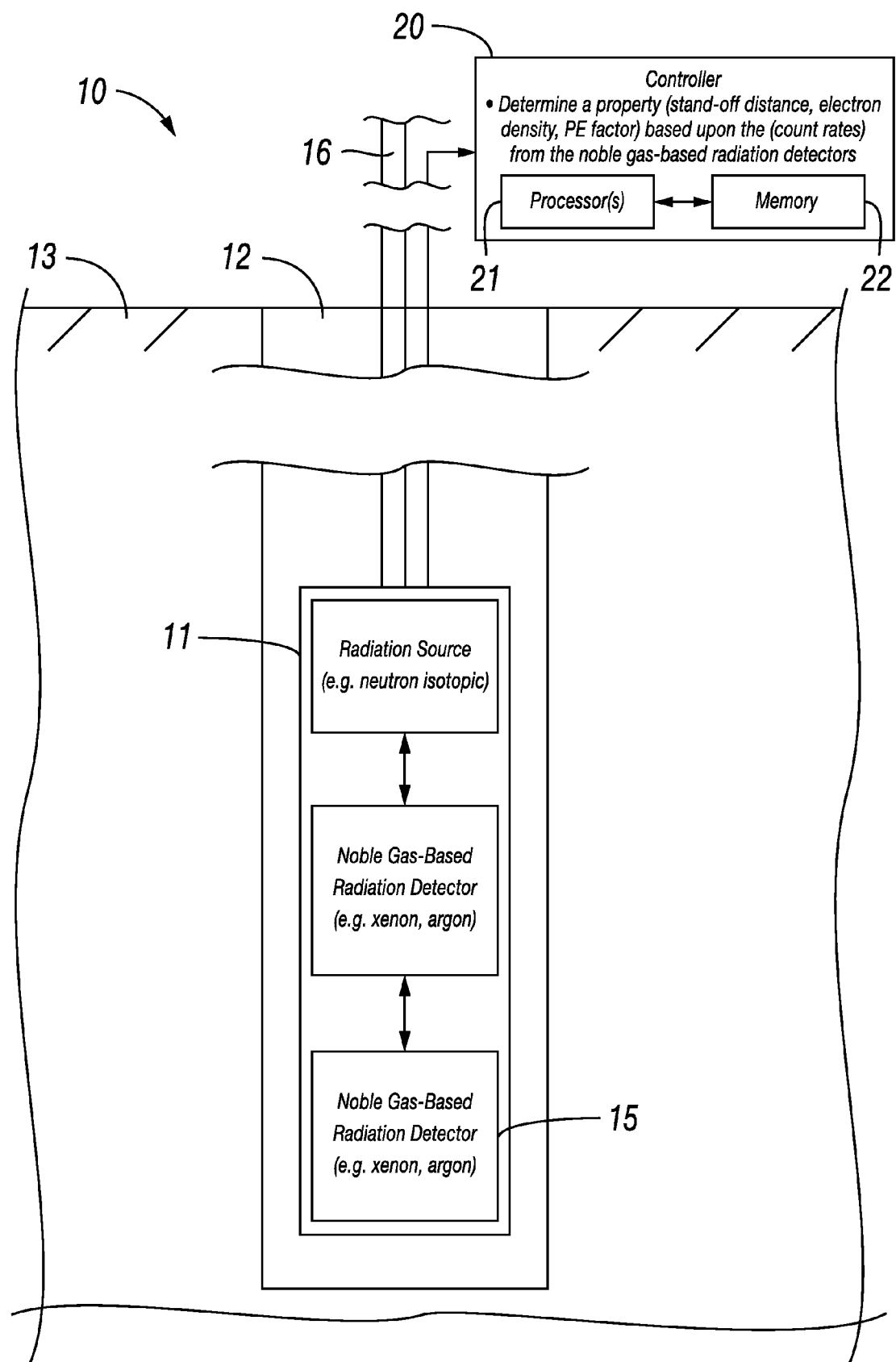
FIG. 1 is a schematic diagram of a subterranean formation including a well logging apparatus in accordance with an embodiment.
Figure 2:
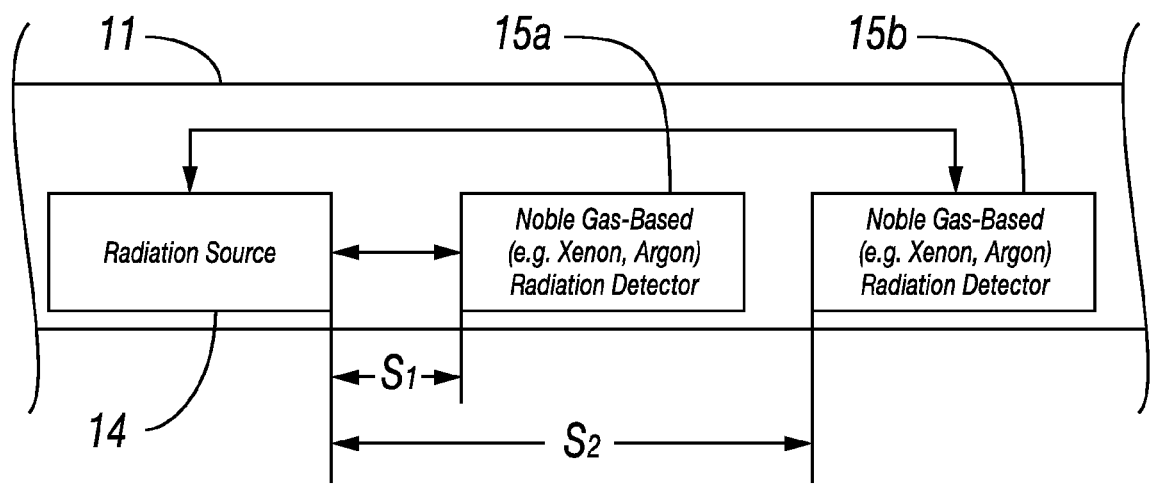
FIG. 2 is a schematic diagram of a portion of the well logging apparatus of FIG. 1.

Referring initially to FIGS. 1 and 2, a well-logging apparatus 10 includes a housing 11 to be positioned within a borehole 12 of a subterranean formation 13. The housing 11 illustratively has a rounded shape, but may be another shape. The housing 11 may be coupled to a tether 16 to position the housing in the borehole 12. For example, the tether 16 may be in the form of a wireline, coiled tubing, or a slickline. Of course, the tether 16 may be another type of tether that may use other techniques for conveying the housing 11 within the borehole 12.

A radiation source 14 is carried by the housing 11. The radiation source 14 may be a neutron generator (accelerator based), for example, or may be a radioisotopic source. Of course, the radiation source 14 may be another type of radiation source. The radiation source 14 directs radiation into the subterranean formation 13.

A pair of noble gas-based radiation detectors 15a, 15b is also carried by the housing 11 and aligned along a periphery of the housing (single azimuth). One of the pair of noble gas-based radiation detectors 15a is at a first axial spacing $s_1$ from the radiation source 14. The other of the pair of noble gas-based radiation detectors 15b is at a second axial spacing $s_2$ from the radiation source 14. The second axial spacing $s_2$ is different from the first axial spacing $s_1$. Of course, while a pair of noble-gas based radiation detectors 15a, 15b are described, more than two noble gas-based radiation detectors may be used. Together, the housing 11, the radiation source 14, and the noble gas-based radiation detectors 15a, 15b define a tool 25. The tool 25 may be rotated in the borehole 12.

The pair of noble gas-based radiation detectors 15a, 15b may be xenon gas-based radiation detectors, for example, xenon tubes. Xenon gas-based radiation detectors are an alternative to traditional radiation detectors, for example, scintillation detectors, since xenon gas-based radiation detectors or tubes may be small enough for different types of logging applications. Moreover, xenon gas-based radiation detectors are less restrictive with respect to operating temperatures and may have a higher tolerance to shock and vibration with respect to scintillation detectors. Also, unlike Geiger-Mueller (GM) counters used in early logging tools, xenon gas-based radiation detectors include a high-Z gas, and are more efficient for photon detection, in particular if the Xenon gas is at a high pressure. And, as opposed to GM-tubes, xenon gas-based radiation detectors or xenon tubes deliver pulse height spectra, i.e. the output signal is proportional to the energy deposited by a gamma ray in the gas. While the noble gas-based radiation detectors 15a, 15b have been described as being xenon gas-based radiation detectors, it should be understood that the noble gas-based radiation detectors may use another noble gas, for example argon.

A controller 20, which may include one or more processors 21 and a memory 22 coupled thereto, determines at least one property of the subterranean formation 13 based upon the detected radiation from the noble gas-based radiation detectors 15a, 15b. For example, based upon the detected radiation, the controller 20 can determine a stand-off distance between the housing 11, or tool 25, and adjacent portions of the borehole 12, an electron density, and/or a photoelectric factor of the subterranean formation 13. Of course the controller 20 may determine other or additional properties of the subterranean formation 13. In some embodiments, the noble gas-based radiation detectors 15a, 15b may generate a count rate. The controller 20 may use the count rate to determine the desired properties of the subterranean formation 13.

By placing the two noble gas-based radiation detectors 15a, 15b (i.e., gamma-ray detectors) at two different axial distances from the radiation source 14, compensated density may be measured, for example. The arrangement of at least the two noble gas-based radiation detectors 15a, 15b and the radiation source 14 at a single azimuth allows the measurement of a subterranean formation density image if the housing 11, is rotated around its axis. Azimuthal information is obtained from the scan of the subterranean formation 13 while rotating the housing 11 or tool 25.

In some embodiments, a single array of azimuthally distributed noble gas-based radiation detectors may be used to obtain a compensated density, for example, if a sufficient number of noble gas-based radiation detectors is available, as will be described in further detail below. The measurement compensation may then be based upon a reconstruction of the stand-off of the different noble gas-based radiation detectors from the adjacent portion of the borehole 12 to obtain compensation.

Figure 3:
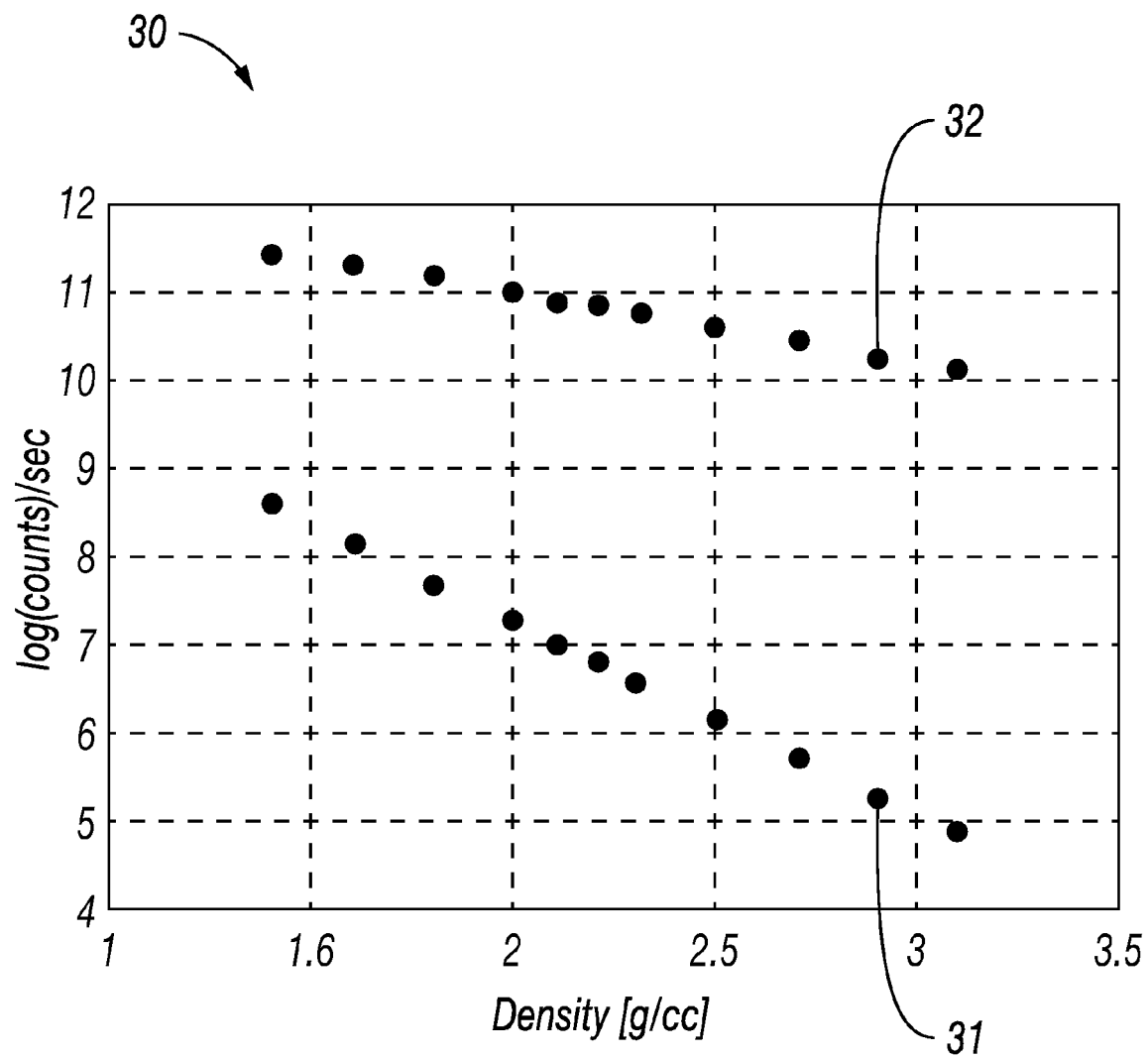
FIG. 3 is a graph of simulated density versus noble-gas based radiation detector count rates.

Referring now to the graph 30 in FIG. 3, to illustrate the above-noted concept, Monte Carlo (MC) simulations were done assuming an isotopic gamma radiation source ($^{137}$Cs) and a pair of xenon gas-based radiation detectors. The dependence of the count rates of the near and far spacing xenon gas-based radiation detectors, or tubes, on the density of the subterranean formation 13 is shown by the lines 31 and 32 in the graph 30.

There are two features of the dependences that show that noble gas-based radiation detectors, for example, xenon gas-based radiation detectors may be used for the density measurement. The first feature is that the dependence of the logarithm of count rate on the subterranean formation density may be linear to a relatively good approximation. The curves bend at relatively low densities similar to those observed with tools using scintillation crystals.

Second, the modeling shows that count rates of both the xenon gas-based radiation detectors are high enough to provide an increasingly statistically precise density measurement at the typical rates of penetration (ROP) in a drill string. Single radiation detector density depends relatively strongly on the mud density and the housing, or tool, stand-off, for example.

Two main algorithms used to measure compensated density are the Spine-and-Ribs approach and the inversion (forward model and inversion) method. The response of the tool 25 was modeled for different stand-offs for water based mud. The Spine-and-Ribs algorithm may be particularly useful for xenon gas-based radiation detectors or tubes and allows the compensated density (or true density of the formation) to be measured.

Figure 4:
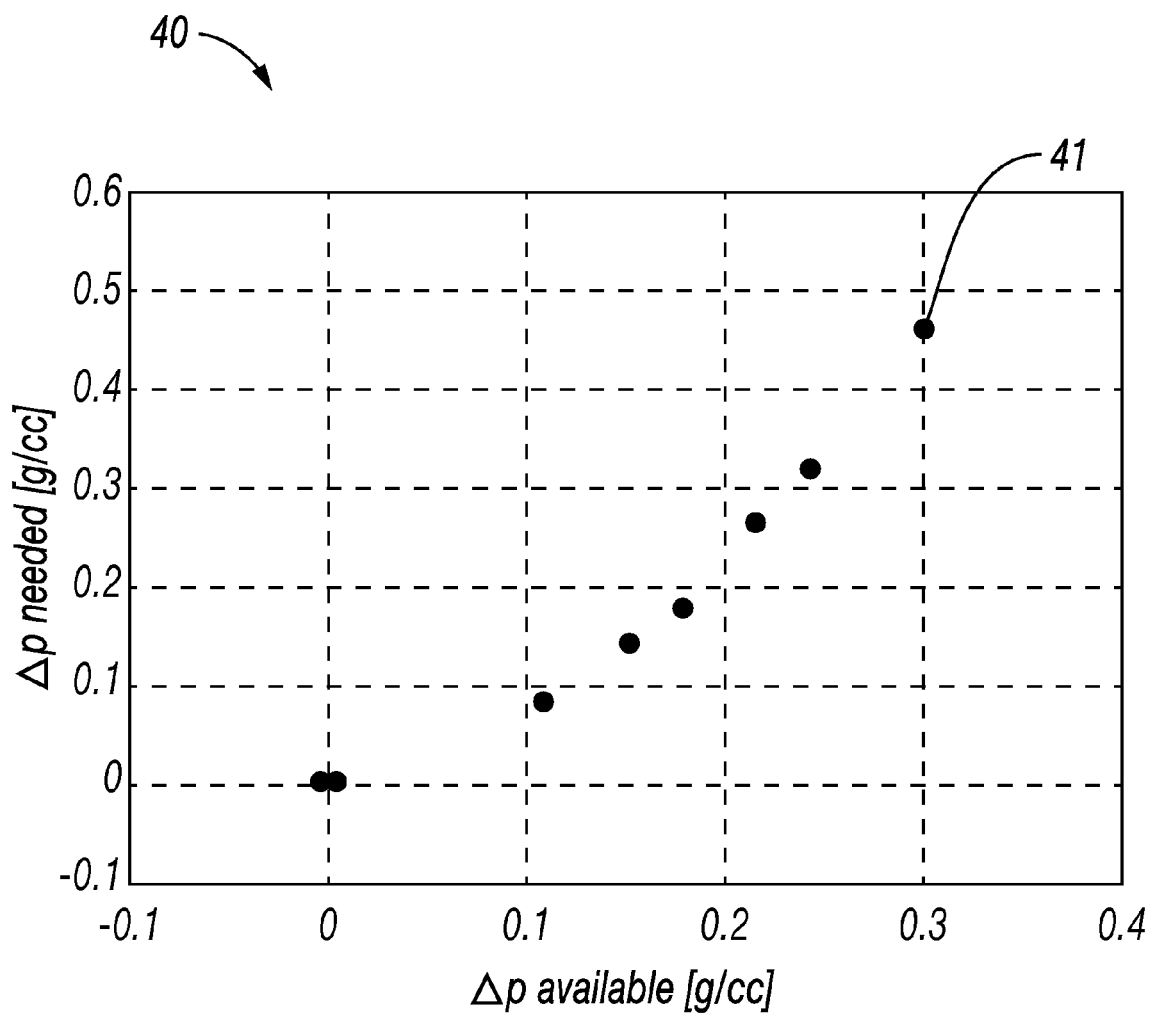
FIG. 4 is a plot of simulated density corresponding to two different subterranean formation densities.

Referring now additionally to the graph 40 in FIG. 4, the ribs 41 for two different formation densities and a borehole fluid density BHDebs are illustrated: 2.2 g/cm$^3$, BHDens=1 g/cm$^3$, and 2.7 g/cm$^3$, BHDens=1 g/cm$^3$. The ordinate in the graph 40 represents the difference between the true electron density of the subterranean formation 13 and the apparent density obtained by a long spaced xenon gas-based radiation detector. The abscissa represents the difference between the apparent density measured by a long spaced xenon gas-based detector and the apparent density measured by a short spaced xenon gas-based detector located at the same or similar azimuth. The radiation detectors used in the simulation are not collimated in this particular model. If the short-spaced xenon gas-based radiation detector is collimated, the rib angle (slope of the curve in the graph 40 in FIG. 4) will be smaller than the one shown in the graph 30 in FIG. 3, and the measurement accuracy for compensated density would be increased.

As mentioned above, radiation detectors based on scintillation crystals may be small enough for some specific cases of borehole applications. For example, if the tool 25 does not rotate, azimuthal information of the subterranean formation 13 may be obtained by using multiple scintillation-based radiation detectors located at different azimuths in the housing 11. For relatively small size tools, space for several scintillator-based radiation detectors may be limited within the housing 11 for azimuthal measurements. The relatively small diameter xenon gas-based radiation detectors 15a, 15b or tubes may be more suitable for such an application.

A compensated density measurement may be performed by using the two noble gas-based radiation detectors, for example, the pair of noble gas-based (xenon) radiation detectors 15a, 15b described above. For the density image, in some embodiments, it may be desirable to use more than one xenon gas-based radiation detector at each of the first and second axial spacings $s_1$, $s_2$ to get azimuthal information without rotating the tool 25. Two noble gas-based radiation detectors may be used if the tool 25 is oriented so that the noble gas-based radiation detectors point to a preferred azimuth. This would preferably be up-down, but other azimuths might be desirable in certain conditions. However, if the tool orientation cannot be controlled, it may be desirable have more than two noble gas-based radiation detectors, for example, at least four noble gas-based radiation detectors at each spacing.

It should be noted that the number of noble gas-based radiation detectors may not have to be the same at the first and second axial spacings $s_1$, $s_2$. However, having the same number of noble gas-based radiation detectors, and having them located at the same azimuth, may simplify the compensation of the density measurement and the determination of the image.

Figure 5:
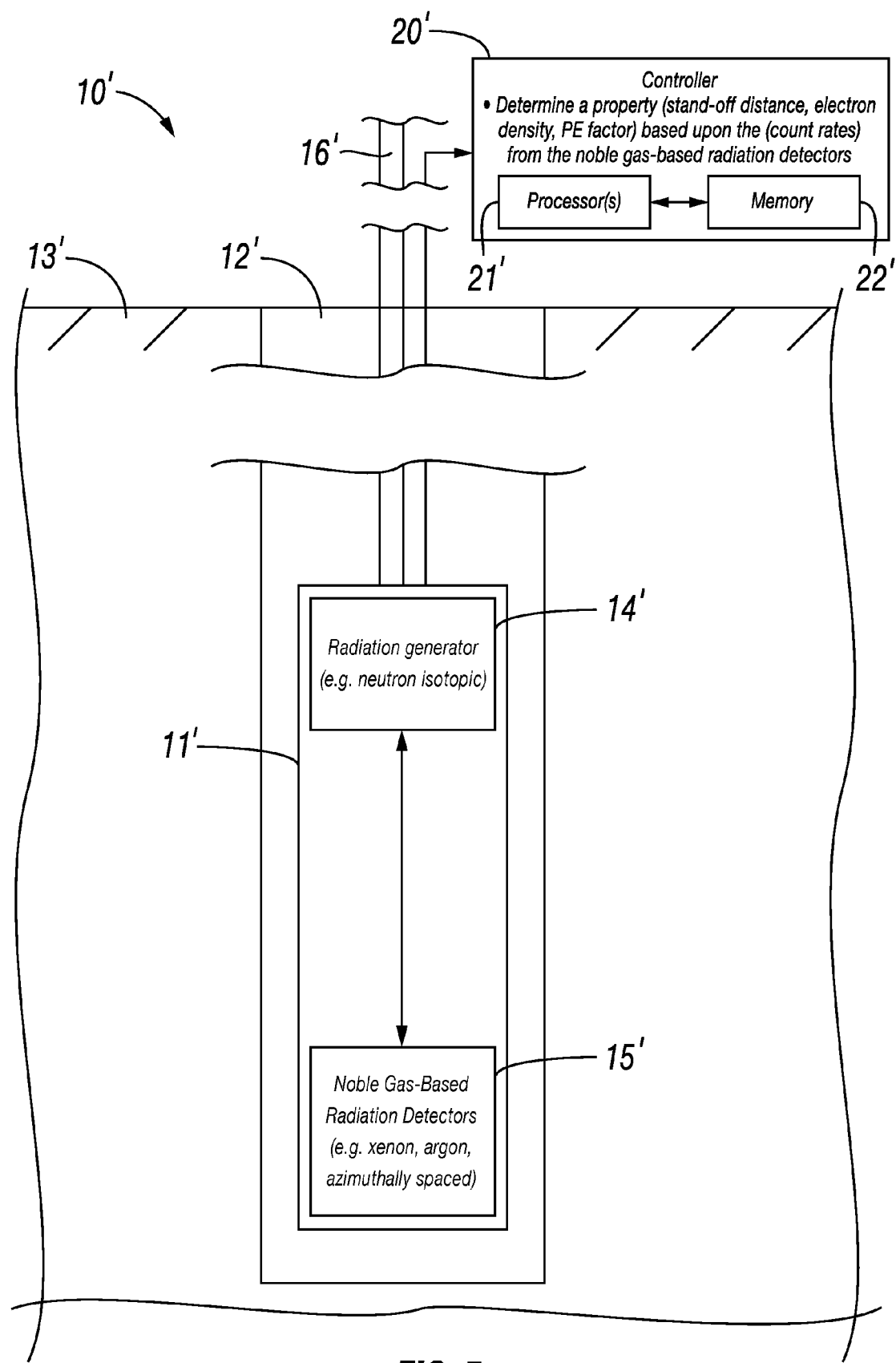
FIG. 5 is a schematic diagram of a subterranean formation including a well logging apparatus in accordance with another embodiment.
Figure 6:
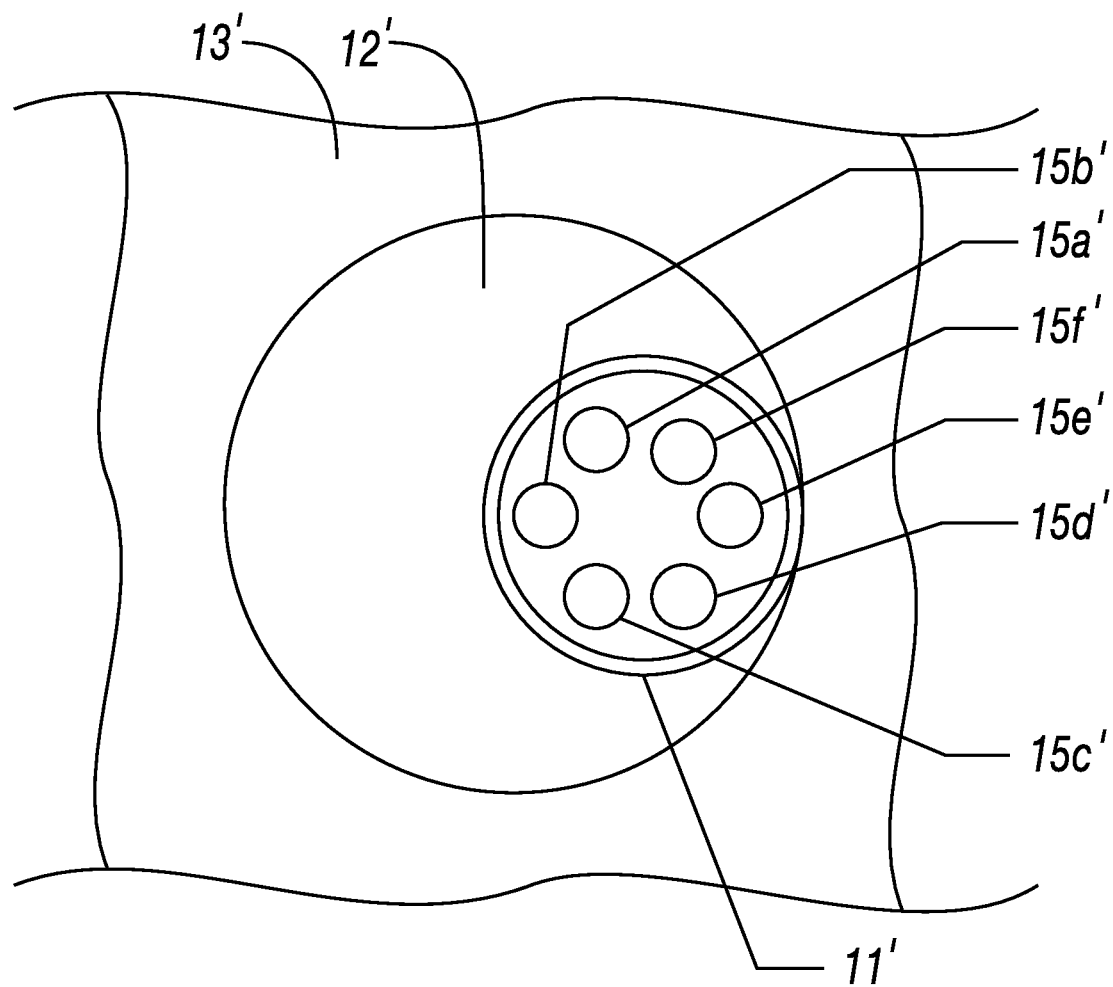
FIG. 6 is an enlarged schematic cross-sectional view of a portion of the well-logging apparatus in FIG. 5 adjacent a wall of the borehole.

Referring now to FIGS. 5 and 6, in another embodiment a non-rotating tool 25' includes noble gas-based radiation detectors 15a'-15f' carried by the housing 11' in azimuthally spaced relation to detect radiation from the subterranean formation 13'. More particularly, the noble gas-based radiation detectors 15a'-15f' are equally azimuthally spaced from one another and are adjacent the periphery of the housing 11'. The radiation detectors 15a'-15f' may be carried by the housing 11' to cover 360-degrees. The noble gas-based radiation generators 15a'-15f' generate a count rate. Moreover, while six noble gas-based radiation detectors 15a'-15f' are illustrated, any number of noble gas-based radiation detectors may be carried by the housing 11'.

The azimuthally distributed noble gas-based radiation detectors 15a'-15f' may be used for determining compensated azimuthal measurements. Additionally, in cases where the borehole fluid composition is unknown or non-uniform around the housing 11', for example, the measurement may be complemented by additional radiation detectors at a different axial spacing, where the additional radiation detectors may not have the same number of noble gas-based detectors as the noble gas-based radiation detectors 15a'-15f', for example, as will be explained in further detail below.

A controller 20', which may include one or more processors 21' and a memory 22' coupled thereto, determines at least one property of the subterranean formation 13' based upon the detected radiation from the noble gas-based radiation detectors 15a'-15f'. For example, based upon the detected radiation, the controller 20' may determine a stand-off distance between the housing 11', or tool 25', and adjacent portions of the borehole 12', an electron density, and/or a photoelectric factor of the subterranean formation 13'. Of course the controller 20' may determine other or additional properties of the subterranean formation 13'. In some embodiments, the noble gas-based radiation detectors 15a'-15f may generate a count rate. The controller 20' may use the count rate to determine the desired properties of the subterranean formation 13'.

Figure 7:
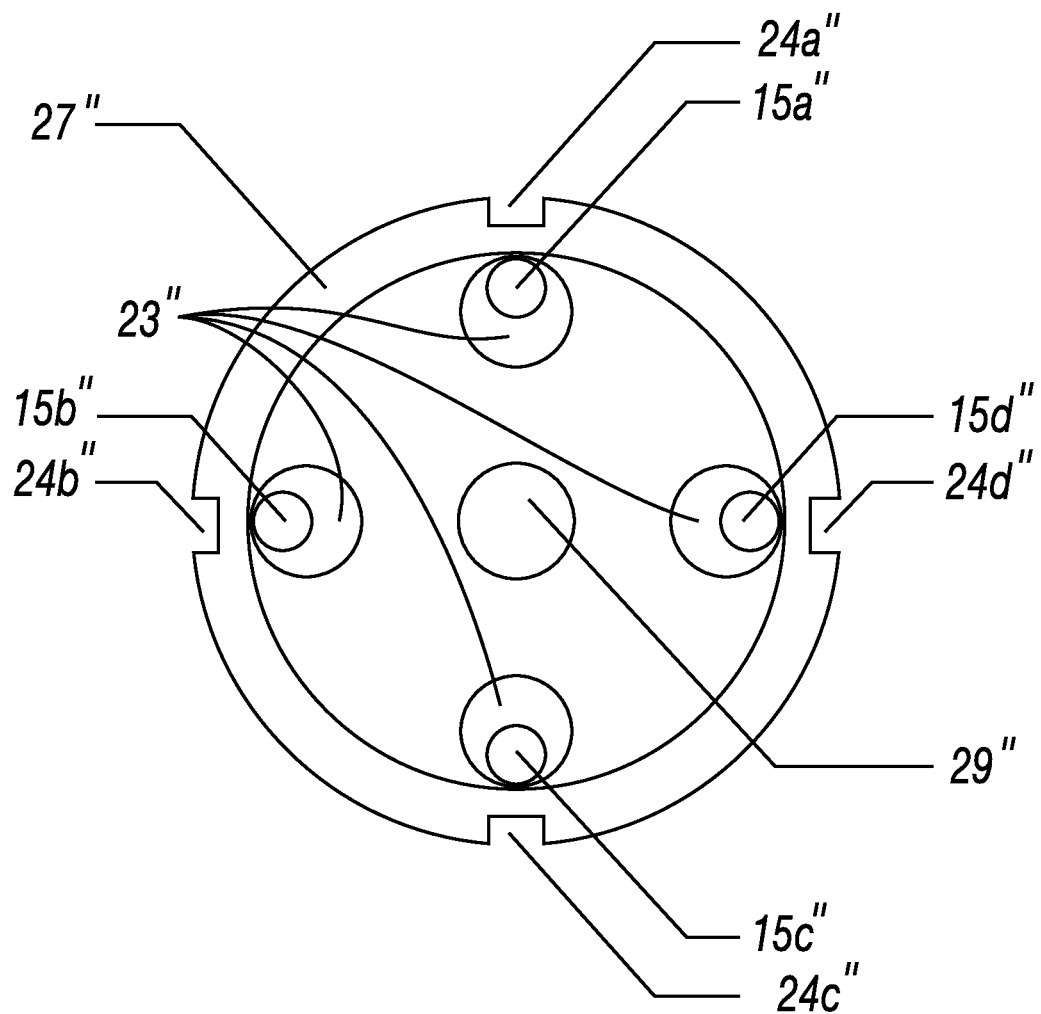
FIG. 7 is an enlarged schematic cross-sectional view of a portion of a well-logging apparatus in accordance with another embodiment.

Referring additionally to FIG. 7, in another embodiment, the well-logging apparatus 10" may also include a shield 23" for the noble gas-based radiation detectors 15a"-15d" to increase azimuthal sensitivity. More particularly, the noble gas-based radiation detectors 15a"-15d", or xenon gas-based radiation detectors or xenon tubes, may be shielded from a mud channel 29" and the back side of the tool 25" by a relatively high density material shield 23". For example, the shield 23" may include uranium and/or tungsten.

To further enhance azimuthal sensitivity, windows 24a"-24d" may be formed in a collar 27" in front of or aligned with each noble gas-based radiation detector 15a"-15d". Each window 24a"-24d" may be a thinned down section of the collar 27", for example. Alternatively, for example, an opening may be formed in the collar 27" and filled with a material of higher gamma-ray transparency (i.e. a material with lower density and lower Z). If the windows 24a"-24d" are not flush on the outside with the collar 27", or a stabilizer is integrated in the collar, then the "empty" space may be filled with a relatively low density material. In this way, the cavity may not fill with mud, the density and composition of which can be highly variable.

The collar 27" may use a low-Z material, for example, titanium and/or a titanium alloy to reduce the attenuation of gamma-rays passing from the subterranean formation 13" to the noble gas-based radiation detectors 15a"-15d". Enhancing the passage of low energy gamma rays or x-rays to the noble gas-based radiation detectors 15a"-15d" improves the density measurement, and also may improve the measurement of the photoelectric factor (PEF) of the subterranean formation 13".

Figure 8A:
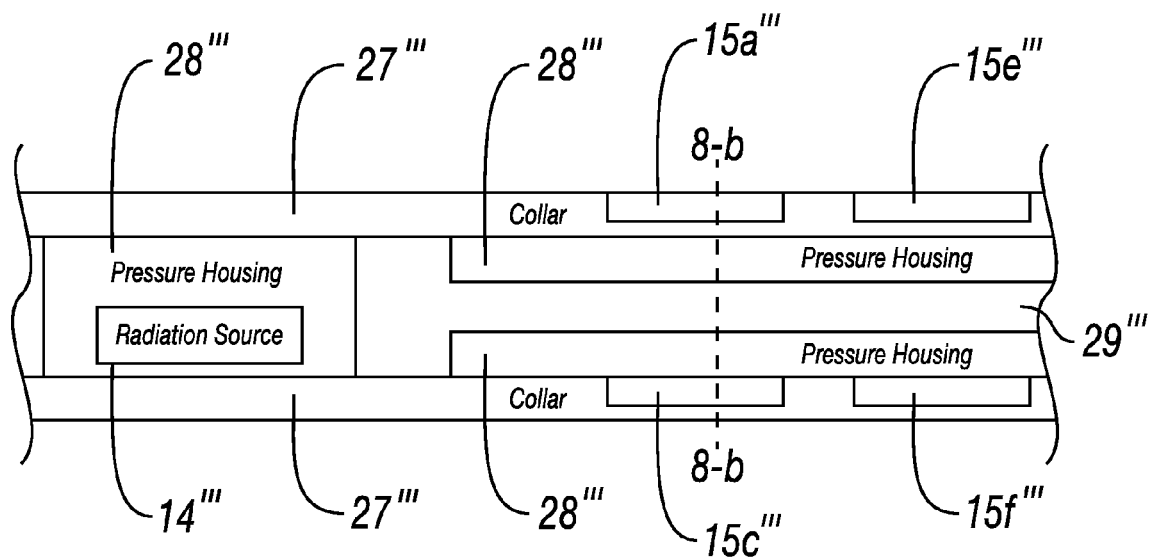
FIG. 8a is a schematic diagram of a portion of a tool of a well-logging apparatus in accordance with another embodiment.
Figure 8B:
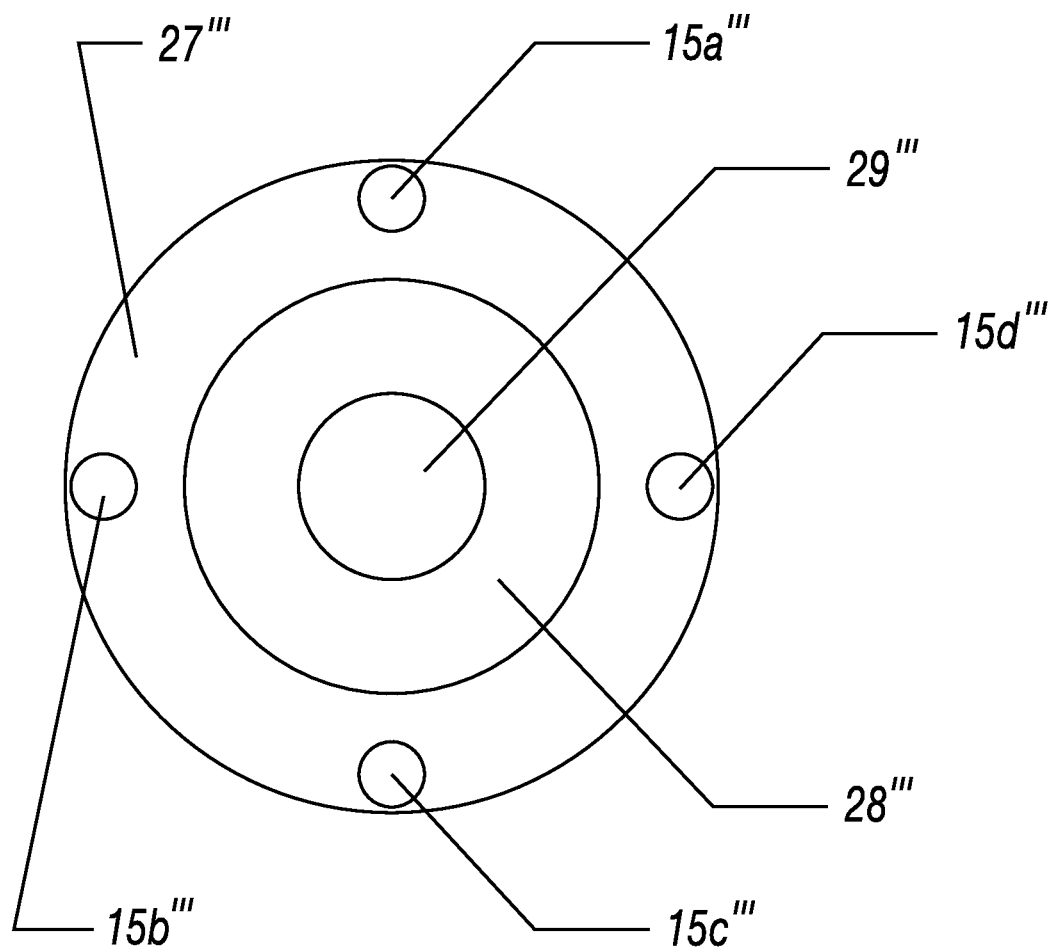
FIG. 8b is an enlarged schematic cross-sectional view of a portion of the tool of FIG. 8a taken along line 8-b.

Referring now to FIGS. 8a-8b, in yet another embodiment, the azimuthally spaced noble gas-based radiation detectors 15a'''-15d''' may be mounted in the collar 27'''. This may provide increased density, increased PEF sensitivity, and increased azimuthal resolution. Additional noble gas-based radiation detectors 15e''', 15f''' may also be carried by the housing 11''' axially spaced from the noble gas-based radiation detectors 15a'''-15 d'''.

Additionally, electronics or circuitry associated with the noble gas-based radiation detectors 15a'''-15d''' may also be in or carried by the collar 27'''. Feedthroughs may be also desirable for signal routing, for example. Similarly to the embodiments described above, the noble gas-based radiation detectors 15a'''-15d''' may be back-shielded to increase azimuthal sensitivity. When the noble gas-based radiation detectors 15a'''-15d''' are mounted in the collar 27''', for example, they may be installed in machined slots under a protective cover. Each noble gas-based radiation detector or detectors of one azimuthal position may be installed in a pressure housing 28''' before mounting on the tool 25'''. Alternatively, in some embodiments where mechanically possible, the noble gas-based radiation detectors 15a'''-15d''' may be installed in axial holes in the collar, which may allow for an installation without a pressure housing around the detectors.

Figure 9A:
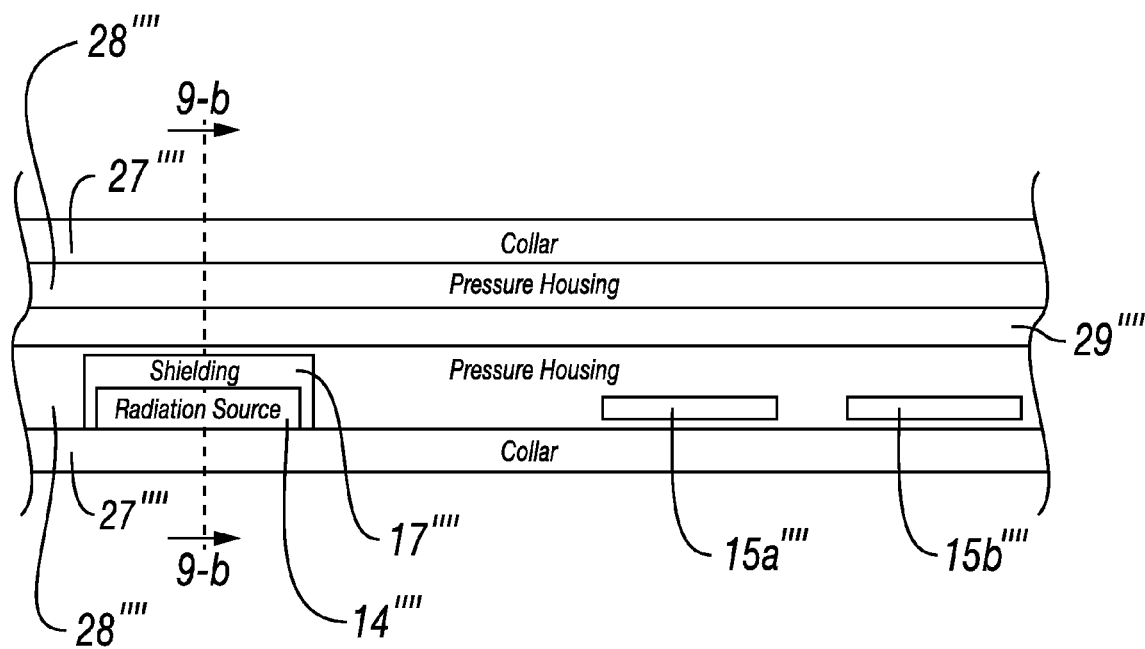
FIG. 9a is a schematic diagram of a portion of a tool of a well-logging apparatus in accordance with another embodiment.
Figure 9B:
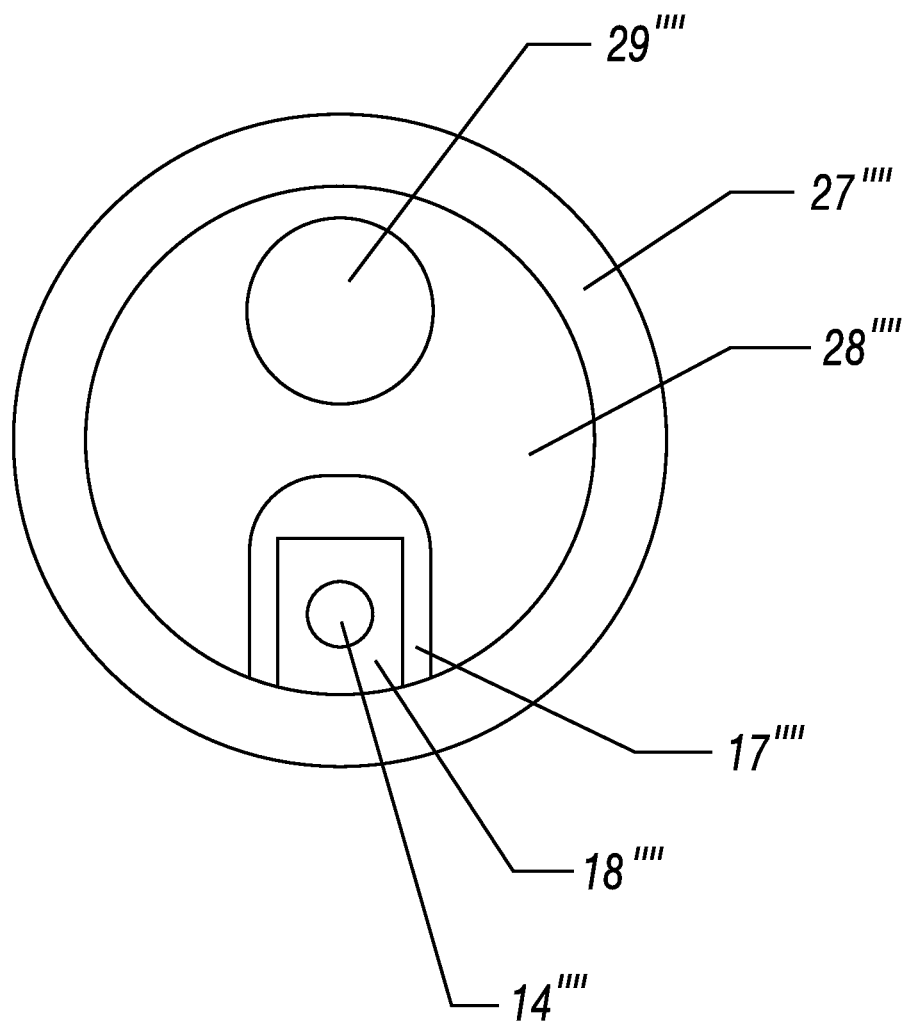
FIG. 9b is an enlarged schematic cross-sectional view of a portion of the tool in FIG. 9a taken along line 9-b.

Referring now additionally to FIGS. 9a and 9b, in another embodiment where the tool 25"" is a rotating tool (i.e., two noble gas-based radiation detectors 15a"", 15b"" axially spaced from the radiation source 14""), the radiation source may be collimated to get increased azimuthal sensitivity. This may accomplished by shielding the radiation source 14"" and leaving a narrow window 18"" directed toward the subterranean formation 13"". Additional shielding 17"" may be positioned along a line of sight between the radiation source 14"" and the noble gas-based radiation detectors 15a"", 15b"" to reduce gamma-ray leakage, for example. This leakage may include gamma-rays that travel through the tool 25"" to the noble gas-based radiation detectors 15a"", 15b"" with little if any interaction outside of the tool, and thus may create an unwanted background that affects precision and accuracy of the measurement.

Figure 10A:
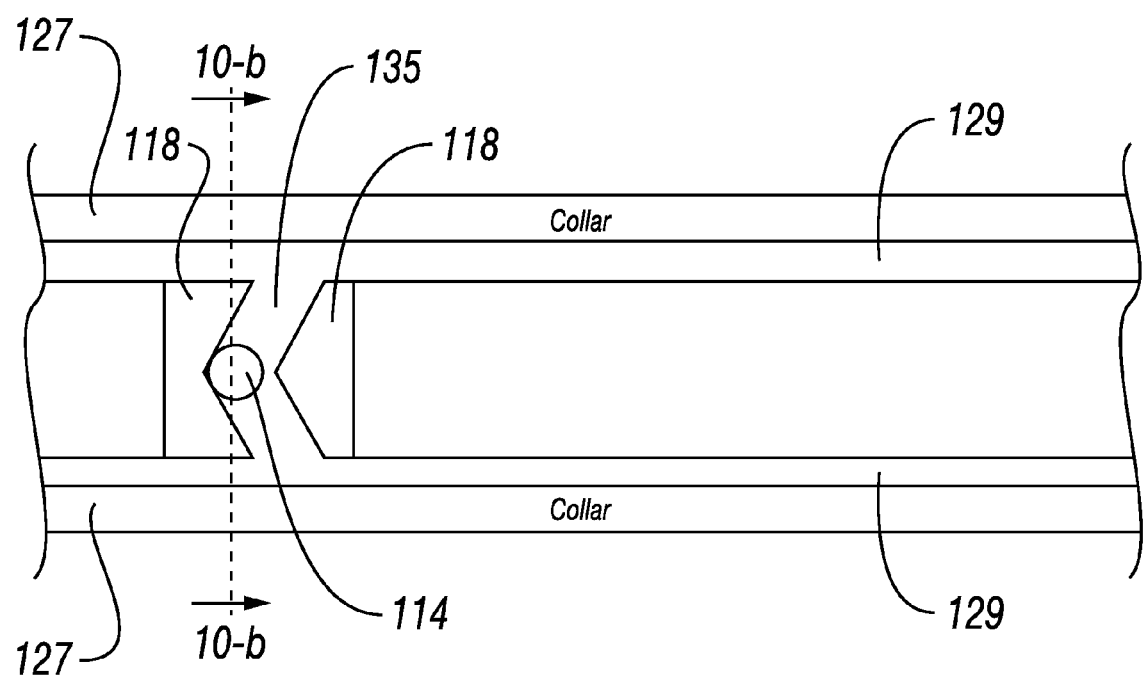
FIG. 10a is a schematic diagram of a portion of a tool of a well-logging apparatus in accordance with another embodiment.
Figure 10B:
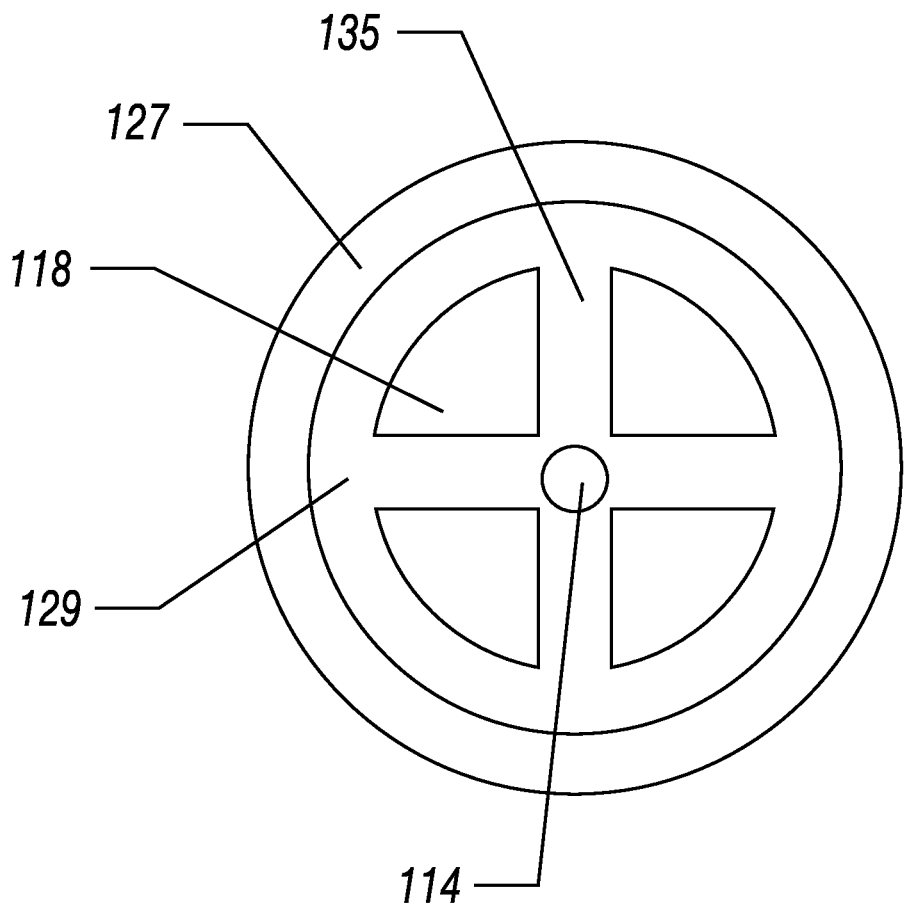
FIG. 10b is an enlarged schematic cross-sectional view of a portion of the tool in FIG. 10a taken along line 10-b.

Referring now to FIGS. 10a and 10b, when multiple noble gas-based radiation detectors are azimuthally spaced, it may be desirable to centralize the radiation source 114 in the pressure housing 127 to obtain a symmetric image. Shielding 118 between the radiation source 114 and the noble gas-based radiation detectors may reduce radiation leakage, for example, gamma-rays, to the noble gas-based radiation detectors, for example, xenon gas-based radiation detectors or xenon tubes. Additionally, the radiation source 114 may be collimated towards the outside of the tool 125 or housing 121 in a direction at each azimuthal position via collimators 135. In some embodiments, collimator channels may be machined in the shield 118, for example. The collimators 135 may be oriented toward noble gas-based radiation detectors at an angle at each azimuthal position. Additionally, windows may be provided in the collar 127 to improve the transmission of the radiation, gamma-ray or x-ray, flux to the subterranean formation 113. It is noted that in the illustrated example embodiments, there are four noble gas-based radiation detectors at each axial distance corresponding to the four orientations of the source collimators 135.

The energy resolution of the noble gas-based radiation detectors, and more particularly, xenon tubes, may be better than that of most scintillation crystals, for example NaI scintillators. By measuring the spectrum of detected radiation or photons, low and high energy photons can be separated, and density and PE-factor measurements can be performed. Having a pair of noble gas-based radiation detectors at two axial distances from the radiation source may be used for the compensated density measurement, for example. For the azimuthal measurement more noble gas-based radiation detectors may be placed in each bank. Of course, in some embodiments, other types of radiation detectors may be used along with the noble gas-based radiation detectors.

When there is no or little stand-off between the tool 25 and the wall of the borehole 12, and at the first and second axial spacings, the corresponding pair of short- and long-spaced noble gas-based radiation detectors 15a, 15b may read relatively the same density which may be equal to the true density of the subterranean formation 13.

When the stand-off increases, for example, the reading of the noble gas-based radiation detectors change and the measured density is a weighted density of the subterranean formation 13 and the mud between the noble gas-based radiation detectors 15a, 15b and the wall of the borehole 12. Usually, the weight of the mud density contribution is higher for the short-spaced noble gas-based radiation detector 15a. Therefore, the difference in the reading of short- and long-spaced noble gas-based radiation detectors 15a, 15b may be a relatively good indicator of stand-off. If the mud weight is known, this difference measures the size of the stand-off.

If there are multiple noble gas-based radiation detectors at each axial spacing to obtain an azimuthal measurement, for example, the differences between the readings of the short- and long spaced pairs may be indicative of the stand-offs around the tool 25, in the direction of each azimuthal pair. Measuring the stand-off on opposite sides of the tool 25, the diameter of the borehole 12 may be determined without rotating the tool.

In an alternative embodiment, some of the detectors may be scintillation detectors, e.g. a set of detectors at one azimuth including scintillation detectors, or that the detectors at one axial spacing are xenon gas-based detectors, while at the second axial spacing scintillation detectors may being used.

Figure 11A:
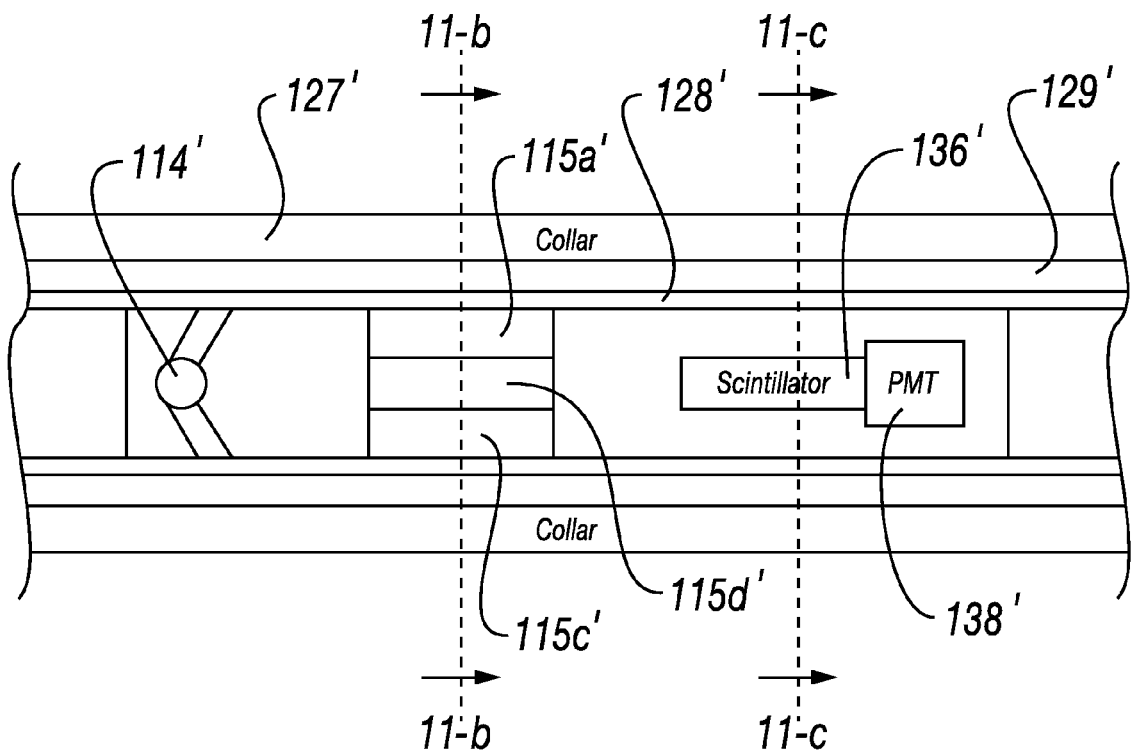
FIG. 11a is a schematic diagram of a portion of a tool of a well-logging apparatus in accordance with another embodiment.
Figure 11B:
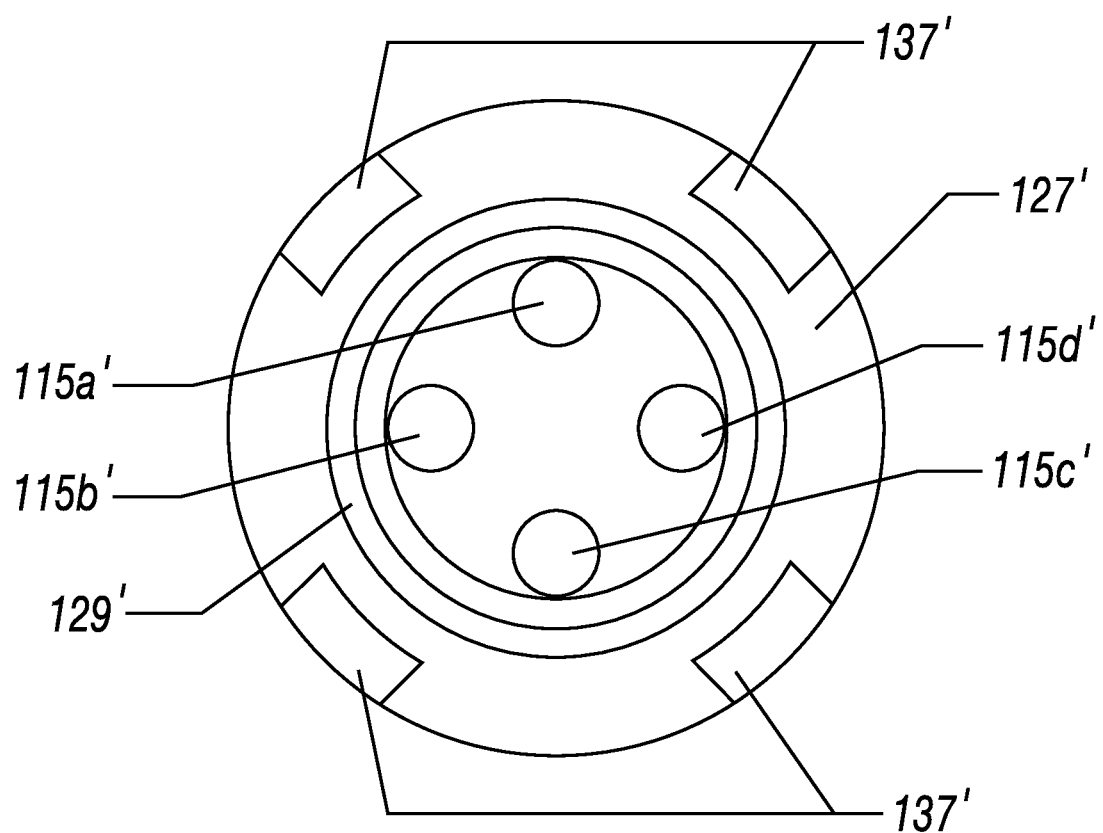
FIG. 11b is an enlarged schematic cross-sectional view of a portion of the tool of FIG. 11a taken along line 11-b.
Figure 11C:
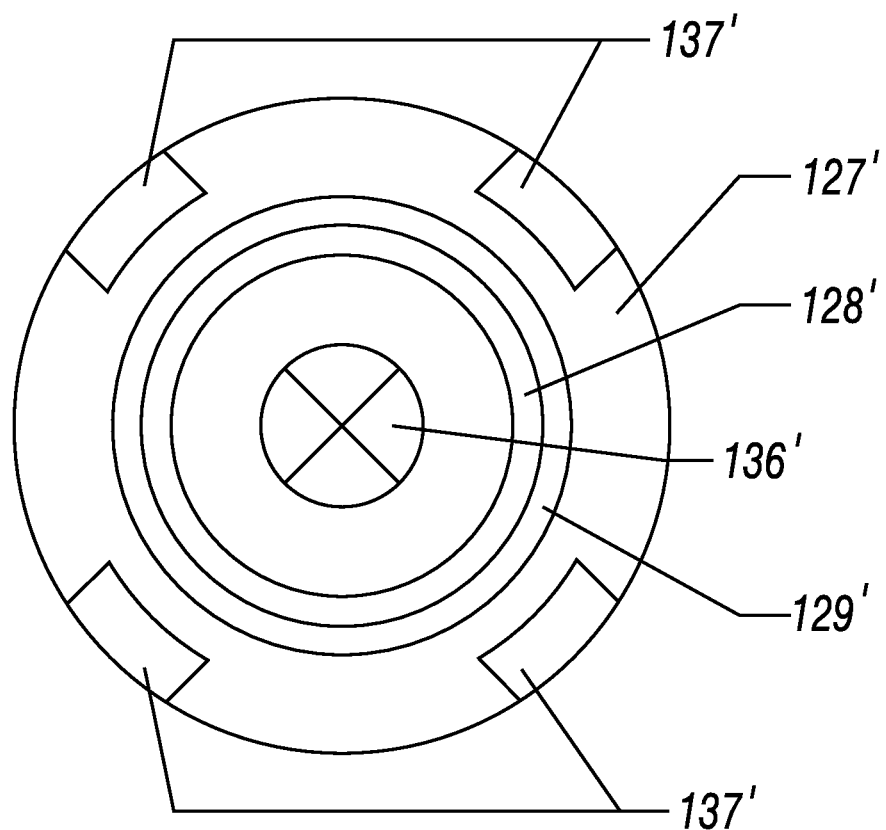
FIG. 11c is an enlarged schematic cross-sectional view of a portion of the tool of FIG. 11a taken along line 11-c.

Referring to FIGS. 11a-11c, an embodiment with azimuthally spaced xenon gas-based radiation detectors 115a'-115d' in a first axial position, and an azimuthally sensitive scintillation detector 136' in a second axial position is illustrated. In this arrangement, added azimuthal sensitivity may be achieved by adding shielding 137' in the collar 127' and/or windows in the collar (FIGS. 11b-11c). In some embodiments, the xenon gas-based radiation detectors may be centered in the collar 127' by supports. These supports may be located axially and azimuthally to provide additional azimuthal shielding. This can be enhanced if the supports include dense high-Z material. A position sensitive photomultiplier 138' is adjacent the scintillation detector 136'.

In yet another approach, a second radiation detector may be a single scintillation detector without azimuthal sensitivity or azimuthal shielding. The azimuthal information may thus be obtained from the noble gas-based radiation detectors. The second radiation detector may provide an average density and PEF response, which may be corrected for stand-off using the information from the noble gas-based radiation detectors.

It should be noted that instead of using a plurality of xenon tubes at different azimuths, one or more azimuthally sensitive xenon counters (e.g. multi-wire tubes) may be used at each location. This, combined with enhanced shielding and collimation, may improve the azimuthal resolution and therefore image quality.

A method aspect is directed to a method of determining a property of a subterranean formation 13'. The method includes directing radiation from at least one radiation source 14' carried by a housing 11' positioned within a borehole 12' of the subterranean formation 13'. The method includes detecting radiation from the subterranean formation 13' using noble gas-based radiation detectors 15a'-15c' carried by the housing in azimuthally spaced relation. The noble gas-based radiation detectors 15a'-15c' may be xenon gas-based radiation detectors, for example, and may be equally spaced from one another. The method includes using a controller 20' to determine the property of the subterranean formation 13' based upon the detected radiation, and more particularly, count rates, generated from the noble gas-based radiation detectors 15a'-15c'.

In some embodiments, the he noble gas-based radiation detectors 15a'-15c' are at a first axial spacing from the radiation source 14'. The method also includes detecting additional radiation from the subterranean formation using an additional radiation detector 136' carried by the housing 21' at a second axial spacing from the radiation source 14'. The method also includes determining, using the controller 20' the property also based upon the additional detected radiation. The property may relate to a stand-off distance between the housing 21' and adjacent borehole portions, an electron density, and a photoelectric factor of the subterranean formation 13'. Of course, the property may include other or additional measurements and/or calculations.

In another method embodiment, a method is directed to a method of determining a property of a subterranean formation 13. The method includes directing radiation from a radiation source 14 carried by a housing 11 positioned within a borehole 12 of the subterranean formation 13. The method also includes detecting radiation from the subterranean formation 13 using noble gas-based radiation detectors 15a, 15b carried by the housing 11. The noble gas-based radiation detectors 15a, 15b may be xenon gas-based radiation detectors, for example. At least one of the noble gas-based detectors 15a is at a first axial spacing $s_1$ from the radiation source 14, and at least one other of the noble gas-based radiation detectors 15b is at a second axial spacing $s_2$ from the radiation source 14 different from the first axial spacing $s_1$. The method further includes determining, using a controller 20 the property of the subterranean formation 13 based upon the detected radiation, and more particularly, count rates generated from the noble gas-based radiation detectors.

Windows 18"" may be aligned with the plurality of noble gas-based radiation detectors 15a, 15b. The property may include a stand-off distance between the housing 11 and adjacent borehole portions, an electron density, and a photoelectric factor of the subterranean formation. Of course, the property may include other or additional measurements and/or calculations.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging apparatus comprising:
    a housing to be positioned within a borehole of a subterranean formation;
    at least one radiation source carried by said housing to direct radiation into the subterranean formation;
    a plurality of noble gas-based radiation detectors carried by said housing in azimuthally spaced relation to detect radiation from the subterranean formation, the plurality of noble gas-based radiation detectors comprising xenon gas-based gamma ray detectors; and
    a controller to determine at least one property of the subterranean formation based upon the detected radiation from the plurality of noble gas-based radiation detectors.

2. The well-logging apparatus of claim 1, wherein said plurality of noble gas-based radiation detectors are equally azimuthally spaced from one another.

3. The well-logging apparatus of claim 1, wherein said housing has a plurality of windows therein aligned with said plurality of noble gas-based radiation detectors.

4. The well-logging apparatus of claim 1, wherein said plurality of noble gas-based radiation detectors are at a first axial spacing from said at least one radiation source; and further comprising at least one additional radiation detector carried by said housing at a second axial spacing from said at least one radiation source to detect additional radiation from the subterranean formation; and wherein said controller is to determine the at least one property also based upon the additional detected radiation.

5. The well-logging apparatus of claim 4, wherein said at least one additional radiation detector comprises a scintillation detector.

6. The well-logging apparatus of claim 1, further comprising a collimator associated with said at least one radiation source.

7. The well-logging apparatus of claim 1, further comprising a radiation shield between said at least one radiation source and said plurality of noble gas-based radiation detectors.

8. The well-logging apparatus of claim 1, wherein each of said plurality of noble gas-based radiation detectors is to generate a count rate; and wherein said controller is to determine the at least one property from the count rates.

9. The well-logging apparatus of claim 1, wherein the at least one property is related to a stand-off distance between the housing and adjacent borehole portions.

10. The well-logging apparatus of claim 1, wherein the at least one property comprises at least one of an electron density, and a photoelectric factor of the subterranean formation.

11. The well-logging apparatus of claim 1, wherein said at least one radiation source comprises at least one of a neutron generator and an isotopic radiation source.

12. A well-logging apparatus comprising:
    a housing to be positioned within a borehole of a subterranean formation and having a plurality of windows therein;
    at least one radiation source carried by said housing to direct radiation into the subterranean formation;
    a plurality of xenon gas-based gamma ray radiation detectors carried by said housing and aligned with the plurality of windows in azimuthally spaced relation to detect radiation from the subterranean formation; and
    a controller to determine at least one property of the subterranean formation based upon the detected radiation from the plurality of xenon gas-based gamma ray radiation detectors.

13. The well-logging apparatus of claim 12, wherein said plurality of xenon gas-based gamma ray radiation detectors are equally azimuthally spaced from one another.

14. The well-logging apparatus of claim 12, wherein said plurality of xenon gas-based gamma ray radiation detectors are at a first axial spacing from said at least one radiation source; and further comprising at least one additional radiation detector carried by said housing at a second axial spacing from said at least one radiation source to detect additional radiation from the subterranean formation; and wherein said controller is to determine the at least one property also based upon the additional detected radiation.

15. The well-logging apparatus of claim 12, further comprising a collimator associated with said at least one radiation source.

16. The well-logging apparatus of claim 12, further comprising a radiation shield between said at least one radiation source and said plurality of xenon gas-based radiation detectors.

17. A method of determining at least one property of a subterranean formation comprising:
    directing radiation from at least one radiation source carried by a housing positioned within a borehole of the subterranean formation;
    detecting radiation from the subterranean formation using a plurality of noble gas-based radiation detectors carried by the housing in azimuthally spaced relation, the plurality of noble-gas based radiation detectors comprising xenon gas-based gamma ray detectors; and
    determining, using a controller, the at least one property of the subterranean formation based upon the detected radiation from the plurality of noble gas-based radiation detectors.

18. The method of claim 17, wherein the plurality of noble gas-based radiation detectors are equally azimuthally spaced from one another.

19. The method of claim 17, wherein the housing has a plurality of windows therein aligned with the plurality of noble gas-based radiation detectors.

20. The method of claim 17, wherein the plurality of noble gas-based radiation detectors are at a first axial spacing from the at least one radiation source; and further comprising detecting additional radiation from the subterranean formation using at least one additional radiation detector carried by the housing at a second axial spacing from the at least one radiation source, and determining, using the controller, the at least one property also based upon the additional detected radiation.

21. The method of claim 17, wherein each of the plurality of noble gas-based radiation detectors generates a count rate; and wherein the controller is used to determine the at least one property from the count rates.

* * * * *